United States Patent [19]

Reich

[11] 4,429,063
[45] Jan. 31, 1984

[54] ANAEROBICALLY CURABLE SEALANT AND ADHESIVE COMPOSITION

[75] Inventor: Karl Reich, Carlsberg, Fed. Rep. of Germany

[73] Assignee: Teroson GmbH, Heidelberg, Fed. Rep. of Germany

[21] Appl. No.: 418,497

[22] Filed: Sep. 15, 1982

[51] Int. Cl.³ .......................... C08K 5/43; C09K 3/10
[52] U.S. Cl. .................................. 523/176; 524/168; 524/169
[58] Field of Search ............... 523/176; 524/168, 169; 564/79; 560/137, 148

[56] References Cited

U.S. PATENT DOCUMENTS

| | | | |
|---|---|---|---|
| 3,454,606 | 7/1969 | Brotherton et al. | 560/148 |
| 3,455,892 | 7/1969 | Froehlich | 564/79 |
| 3,856,786 | 12/1974 | Huber | 560/148 |
| 3,915,931 | 10/1975 | Gilleo et al. | 524/168 |
| 3,957,561 | 5/1976 | Skoultchi | 523/176 |
| 3,988,299 | 10/1976 | Malofsky | 523/176 |
| 3,991,261 | 11/1976 | Gruber | 523/176 |

OTHER PUBLICATIONS

Onodera, R.: Chemical Abstracts, vol. 57, 14932g (1962).
Appel, Rolf and Gerber, Hermann: Chem. Ber. 91, pp. 1200-1203 (1958).

*Primary Examiner*—Veronica P. Hoke
*Attorney, Agent, or Firm*—Howard J. Troffkin; William W. McDowell

[57] ABSTRACT

Anaerobically curable sealant and adhesive compositions comprising polymerizable acrylate esters or methacrylate esters and a redox system as accelerator are stabilized by the addition of sulfamide derivatives containing the group

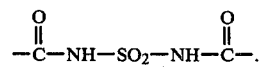

The stabilization may be further improved by using the sulfamides in combination with phenolic anti-oxidants, particularly sterically hindered phenols, without reducing the curing rate of the compositions.

8 Claims, No Drawings

ANAEROBICALLY CURABLE SEALANT AND ADHESIVE COMPOSITION

BACKGROUND OF THE INVENTION

1. Field of the Invention

The invention relates to storable sealant and adhesive compositions showing extended shelf life in the presence of oxygen but being rapidly curable upon exclusion of oxygen. Such compositions are generally referred to as anaerobically curable. They comprise polymerizable acrylate or methacrylate ester monomers and a redox system as polymerization initiator and accelerator.

2. Description of the Prior Art

It is generally known to add stabilizers to materials containing vinyl compounds in order to prevent premature polymerization during storage and as a result of adding said stabilizers an adequate storage stability is normally obtained. Generally, no particular difficulties are encountered in stabilizing radically polymerizable monomers at ambient temperature. However, considerable problems arise if the monomers already contain an accelerator system formed by a peroxidic initiator and an amine, as is the case with anaerobically curable adhesives. The particular difficulty is that in most cases effective stabilizers reduce the curing rate of such adhesive mixtures.

A large number of substances has been proposed for the stabilization of anaerobically curable adhesives. On the basis of their mechanism they can essentially be subdivided into three groups:

1. Precursors for free radicals which are able to react with macroradicals of a growing chain so that as a result more stable free radicals are formed which prevent chain growth and consequently polymerization. This group includes standard anti-oxidants such as phenols, hydroquinones, sterically hindered phenols and hydroquinones, quinones, diphenylamine derivatives, etc. Nitrones (German published application No. 2,441,963) can also be placed in this group. The addition of hydroquinones to anaerobically curable adhesive mixtures increases their stability during storage but at the same time they loose the capability to harden on metal substrates. Sterically hindered phenols do not have this disadvantageous effect to the same extent but their stabilizing effect is not significant. The also known N-nitrosamines and hydroxyl amines have carcinogenic properties so that their use cannot be considered.

2. Stable free radicals which can react with macroradicals and stop the chain growth are effective as inhibitors. These include nitroxyls according to German Pat. No. 2,060,645. They have the disadvantage of being compounds with a clearly defined half-life period which therefore gradually decompose during storage. A further disadvantage of these compounds is that they delay the complete curing of anaerobic adhesives on non-ferrous metals, such as zinc.

3. Compounds which reduce the metal content of the monomers by compound or complex formation, which also increases the stability of adhesive mixtures. These compounds more particularly include chelating agents, such as derivatives of ethylene diamine, tetraacetic acid (EDTA), cf German published application No. 2,113,094. This stabilization method has the disadvantage that when the adhesives are used on metals, it is necessary to eliminate the action of the chelating agent before the hardening process starts which increases the required curing time.

OBJECTS OF THE INVENTION

It is therefore an object of the present invention to find a stabilizer which will considerably improve the shelf life of anaerobically curable sealant and adhesive compositions comprising polymerizable acrylate or methacrylate esters and an accelerator system composed of a peroxide polymerization initiator and an amine reducing agent. It is a further object to find a stabilizer which will not only improve the shelf life of the compositions but will also not extend but preferably reduce their curing time.

DESCRIPTION OF THE INVENTION

In the search for stabilizers which do not have the aforementioned disadvantages of the prior art compounds it was surprisingly found that sulfamide derivatives, particularly in combination with sterically hindered phenols, are excellent stabilizers for anaerobically curable adhesives. It was unexpectedly found that the hardening properties are in fact improved and not impaired.

It was found that the stabilizing action of sulfamide derivatives is not dependent on the nature of the substituents. Instead it is essential that the compounds are derived from the group

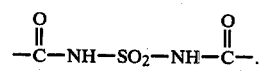

Compounds having the group

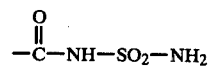

only lead to a slight improvement in the stability of anaerobic adhesive mixtures. The discovery of the stabilizing effect of sulfamides was all the more surprising in that it was hitherto only known that certain other sulphur/nitrogen compounds, e.g. sulfimides, sulfonic hydrazides, disulfonyl amides and sulfonyl hydrazones are accelerators rather than stabilizers in anaerobically hardening adhesive mixtures (cf German published application No. 2,005,043; German Pat. No. 2,441,918; German Pat. No. 2,441,920; German published application No. 2,442,001).

Sulfamide derivatives having the aforementioned advantageous properties preferably are compounds of the following general formula:

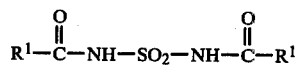  I

In this formula, the radicals $R^1$ are the same or different and in each case stand for hydrogen or for linear or branched-chain alkyl with 1 to 18 carbon atoms, cycloalkyl with 3 to 8 carbon atoms, phenylmethyl, or hydrocarbyloxy $-OR^2$, where $R^2$ is a linear or branched-chain alkyl with 1 to 18 carbon atoms, cycloalkyl with 3 to 8 carbon atoms, phenyl, phenylalkyl with 1 to 4 carbon atoms in the alkyl group, or alkylphenyl with 1 to 4 carbon atoms in the alkyl group or groups. $R^1$ can also be trifluoro- or trichloro-methyl or when hydrocarbyloxy $R^2$ can also be diphenyl- or triphenylmethyl.

The sulfamide derivatives of general formula I used in accordance with the invention improve the stability of anaerobically hardening adhesives during storage. However, this effect increases considerably if the sulfamides are used in combination with phenolic stabilizers (antioxidants). The sulfamide:phenol ratio can vary within wide limits, so that the combination may contain 1 to 90% by weight of the sulfamide derivative and 99 to 10% by weight of the phenolic anti-oxidant. Preferably, the sulfamide:phenolic anti-oxidant ratio is between approximately 1:1 and 1:4, a particularly advantageous ratio being 1:2. Based on the adhesive composition approximately 0.1 to 10% by weight, preferably 0.5 to 5% by weight and in particular 0.8 to 2% by weight, e.g. 1% by weight of the sulfamide derivative is used.

Phenols according to the following general formula

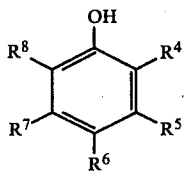

are suitable as co-stabilizers; in the formula the radicals $R^4$, $R^5$, $R^7$ and $R^8$ in each case stand for hydrogen or an alkyl group with 1 to 4 carbon atoms and the radical $R^6$ either has the same meaning or is a hydroxy or methoxy group.

Preference is given to sterically hindered phenols, 2,5-di-tert.-butyl hydroquinone having proved particularly advantageous.

Anaerobically curable adhesives have long been known to the expert. They generally comprise as polymerizable monomers mono-, di- or tri-acrylates and/or-methacrylates. Suitable acrylate and/or methacrylate esters are abundantly described in the literature, cf U.S. Pat. No. 3,218,305. In the manner known from the literature, the polymerizable monomers or oligomers can be modified in many different ways by using different monofunctional or polyfunctional alcohols or by reacting hydroxy-substituted acrylate or methacrylate esters with isocyanates or carboxylic acid derivatives.

The acrylate or methacrylate-based anaerobically curable adhesive mixtures contain a redox system as curing accelerator. Hydroperoxides and in particular cumene hydroperoxide have proved advantageous as radical-forming initiators. Suitable reducing components are in particular tertiary aromatic amines, e.g. N,N-dimethyl-4-toluidine or heterocyclic secondary amines with a hydrogenated heterocyclic ring, e.g. 1,2,3,4-tetrahydroquinoline, but reference should also be made to U.S. Pat. No. 3,218,305 in connection with further suitable components of the redox system. It is also already known from U.S. Pat. No. 3,218,305 to further improve and accelerate the curing of such adhesive mixtures by adding an organic sulfimide, e.g. benzoic sulfimide. The teaching of U.S. Pat. No. 3,218,305 is incorporated herein by reference.

In such adhesive mixtures, the stabilizers used according to the invention have the completely surprising property of not only very considerably improving the stability during storage but of also accelerating the curing.

N,N'-diacyl-sulfamides have long been known. Thus, C. H. Anderson and E. F. Degering describe in Proc. Indiana Acad. Sci. 1946, 56, 134–135 the preparation of certain representatives of this class of compounds with a yield of 55% of theory by acylating sulfamide in the absence of solvents in accordance with the following equation:

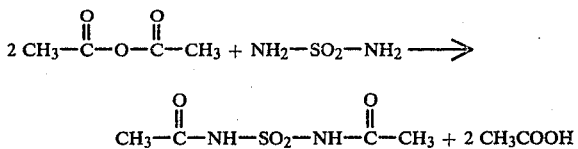

German Pat. No. 876,846 describes a modified process which is also based on the acylation of sulfamide. A yield of 78% of theory is given therein for the preparation of N,N'-diacetyl sulfamide.

As the preparation of the sulfamide starting compound is a time-consuming and complicated process (cf HOUBEN-WEYL, Methoden der Organischen Chemie, Vol. XI/2, 4th edition, 1958, 713) and provides sulfamide with only 44% yield, it was of interest to develop a process for supplying the desired N,N'-diacyl sulfamides with high yield and purity.

It has surprisingly been found that in sulfuryl diisocyanate $OCN-SO_2-NCO$ both isocyanate groups provide in a smooth reaction with carboxylic acid N,N'-diacyl sulfamides with high yield:

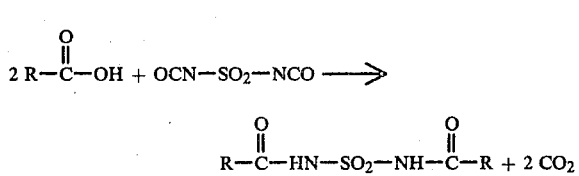

It is merely necessary to heat the two components in an organic solvent until $CO_2$ evolution stops. This generally requires at a temperature of 70° to 80° C. a time of 1 to 2 hours. The sulfuryl diisocyanate required as the starting substance can be obtained by the process of German Pat. No. 940,351 (cf also HOUBEN-WEYL, Methoden der Organischen Chemie, Vol. XI/2, 4th edition, 1958, 724).

With particular advantage, the reactants used are aliphatic carboxylic acids and R can be hydrogen, a linear or branched-chain $C_1$-$C_{18}$ alkyl group or a $C_3$-$C_8$ alkyl group or a benzyl group.

The above process has made it possible to prepare for the first time N,N'-diformyl sulfamide and N,N'-bis-(cyclohexylcarbonyl)-sulfamide, neither of which are described in the literature.

Through the selection of a suitable solvent in which the starting substances are soluble but the desired end product is insoluble, the latter slowly crystallizes and is obtained with a high purity and does not have to be recrystallized.

It has proved advantageous for certain uses to perform the reaction in a solvent in which the end product is also soluble. This is, for example, the case if N,N'-diacyl sulfamides are to be further processed in the form of a solution, so that there is no redissolving of the preparations. According to a specific embodiment of the invention, tetrahydrofuran is used as a solvent, because the latter participates in the reaction through polymerization giving preparations which are not precipitated from the solution during dilution with inert solvents such as benzene, and this greatly facilitates the use according to the invention as stabilizer in anaerobic adhesives.

N,N'-bis-(alkoxycarbonyl)-sulfamides and N,N'-bis-(aryloxycarbonyl)-sulfamides can be obtained in quantitative yield by adding the corresponding alcohols or phenols to sulfuryl diisocyanate:

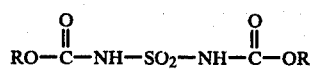

cf U.S. Pat. No. 3,326,967, R. Appel and H. Gerber, Chem.Ber. 91, 1200–1203 (1958), N. Onodera, Kogyo Kagaku Zasshi 65, 790–793 (1962), U.S. Pat. No. 3,420,867.

The following examples serve to further illustrate the invention.

EXAMPLE 1

Preparation of N,N'-diacetyl-sulfamide.

12 g of anhydrous acetic acid are dissolved in 150 ml of absolute benzene and 14.8 g of sulfuryl diisocyanate (prepared in accordance with German Pat. No. 940,351) are added dropwise within 20 minutes at ambient temperature, accompanied by stirring. The temperature rises from 21° to 39° C. and $CO_2$ evolution as well as a precipitation of a colorless precipitate occur. The reaction mixture is heated by means of an oil bath to 60° C. accompanied by stirring until the evolution of the gas is at an end, which takes 2 hours. The reaction mixture is cooled, the precipitate removed by suction filtering and dried at 60° C. 17.8 g of colorless crystals are obtained (98.8% of theory), m.p. 167°–169° C. (decomp.) which can be recrystallized from isopropanol and acetic acid.

The IR-spectrum shows bands at 3220 cm$^{-1}$ (NH-stretching vibration), 1710 cm$^{-1}$ (C=O-stretching vibration) and 1490/1170 cm$^1$ (asymmetric and symmetric $SO_2$-stretching vibration).

The $^1$H-NMR spectrum (DMSO-d$^6$) has the following absorptions:

$\delta$=1.96 ppm, s, 6 H for the two $CH_3$ groups, $\delta$=12.10 ppm, s wide, 2 H, exchangeable with $D_2O$, for the two NH groups.

Elementary analysis: Calculated for $C_4H_8N_2O_4S$: C 26.66%, H 4,48%, N 15.55%. Found: C 26.64%, H 4.35%, N 15.65%.

The same process is used for the preparation of the following N,N'-diacyl sulfamides:

| R | Yield | m.p. |
| --- | --- | --- |
| H | 91% | 147–148° C. |
| ethyl | 96% | 152–153° C. |
| n-propyl | 89% | 148–151° C. |
| cyclohexyl | 88% | 179–182° C. |
| benzyl | 84% | 174–175° C. |

EXAMPLE 2

Reaction of sulfuryl diisocyanate with acetic acid in tetrahydrofuran.

36 g of anhydrous acetic acid are placed in 200 ml of absolute tetrahydrofuran and 44.4 g of sulfuryl diisocyanate are added dropwise within 20 minutes accompanied by stirring. The temperature rises up to the reflux temperature of the tetrahydrofuran. This is accompanied by $CO_2$ evolution, which ends after 2 hours. The tetrahydrofuran is evaporated in vacuo and the residue in the form of a slightly cloudy, viscous, yellow oil is diluted with absolute benzene. A small amount of yellow flakes forms and settles at the bottom. The clear benzene solution is evaporated in vacuo. 100.1 g of a yellow, viscous oil are left behind which does not crystallize even after prolonged standing. A preparation prepared in this way has all the properties of N,N'-diacetyl sulfamide with regard to the stabilizing effect in anaerobic adhesives. However, it has the advantage of excellent solubility therein.

The trifluoromethyl derivative is prepared in the same way.

EXAMPLE 3

Preparation of N,N'-bis-(benzyloxycarbonyl)-sulfamide.

10 g of anhydrous benzyl alcohol are placed in 150 ml of absolute benzene and 7.4 g of sulfuryl diisocyanate are added dropwise accompanied by stirring. The exothermic reaction which takes place leads to a rise in the temperature to 45° C. and shortly after the start a precipitate is formed. Following the temperature drop, stirring is continued for 1 hour at ambient temperature. The resulting precipitate is suction filtered and dried at 60° C. giving a yield of 18.06 g of colorless crystals (99.2% of theory), m.p. 139°–141° C., which can be recrystallized from ethanol.

IR spectrum: 3290/3210 cm$^{-1}$ (NH-stretching vibration), 1755 cm$^{-1}$ (C=O stretching vibration), 1495/1150 cm$^{-1}$ (asymmetric and symmetric $SO_2$ stretching vibration) and 1225 cm$^{-1}$ (C-O stretching vibration).

$^1$H-NMR spectrum (acetone-d$^6$):

$\delta$=5.18 ppm, s, 4 H for the two $-OCH_2$ groups, $\delta$=7.35 ppm, s, 10 H for the two phenyl radicals, $\delta$=10.7 ppm, s, wide, 2 H, exchangeable with $D_2O$, for the two NH groups.

Elementary analysis: Calculated for $C_{16}H_{16}N_2O_6S$: C 52.74%, H 4.43%, N 7.69%. Found: C 52.40%, H 4.34%, N 7.74%.

The same process is used for the preparation in a quantitative yield of the following addition products:

| R | m.p. (found) |
| --- | --- |
| $-OCH_3$ | 163–165° C. |
| $-OC_2H_5$ | 168–169° C. |
| $-OC_3H_7(n)$ | 137° C. |
| $-OC_4H_9(n)$ | 78–79° C. |
| $-OC(CH_3)_3$ | 152–153° C. |
| $-OC_6H_5$ | 153–154° C. |

The following example shows the effectiveness of the stabilizers according to the invention in a conventional anaerobic adhesive formulation. The determination of the gelation time at 80° C. in minutes is used as an indication of the stabilizing activity. The measurements are performed with an automatically recording TECHNE gelation time measuring instrument. The stabilized anaerobic adhesive formulations are placed in test tubes of dimensions 100×12 mm up to a filling level of 25 mm. A flattened glass rod with an external diameter of 4 mm is used as indicator. The measured values given in the examples are mean values from in each case six measurements.

To check the influence of the stabilizer compositions on the hardening properties of the anaerobic adhesive formulations, the finger tight time is additionally measured on steel screws according to DIN 933 of dimensions M10×20, quality 4.6, and the associated nuts. The finger tight time is the time in minutes (calculated from the time of screwing) after which a finger placed under slight pressure on a nut coated with adhesive brings about no further movement on a screw which is also adhesive-coated.

EXAMPLE 4

A. For determining the influence of phenolic stabilizers on the stability of anaerobic adhesives, the following adhesive formulation is prepared (values in % by weight):

Diethyleneglycol dimethacrylate: 95
Acrylic acid: 1
Cumene hydroperoxide (80% in cumene): 2
N,N'-dimethyl-4-toluidine: 1
Saccharin (benzoic sulfimide): 1

This formulation is also used as an adhesive base in the following tests in which the influence of the stabilizer compositions on anaerobic adhesives is investigated. Different phenolic stabilizers and different concentrations are added to the adhesive base and the gelation time is measured at 80° C., as well as the finger tight time on non-degreased steel screws. In both cases, the mean values of 6 measurements are given. The following table 1 shows the found interrelation.

TABLE 1

| Stabilizer | Concentration (% by wt) | Gelation time at 80° C. (min) | Finger tight time (min) |
|---|---|---|---|
| None | — | 5 | 3 |
| Hydroquinone | 0.5 | 8 | 15 |
| | 1.0 | 12 | 120 |
| | 3.0 | 60 | >120 |
| 4-methoxyphenol | 0.5 | 3 | 6 |
| | 1.0 | 6 | 8 |
| | 3.0 | 8 | 15 |
| 2,5-di-tert.-butyl-hydroquinone | 0.5 | 11 | 4 |
| | 1.0 | 19 | 5 |
| | 3.0 | 38 | 10 |
| 2,6-di-tert.-butyl-4-methyl-phenol | 0.5 | 8 | 40 |
| | 1.0 | 12 | 63 |
| | 3.0 | 38 | >120 |

As can be gathered from the gelation time and finger tight time values, the storage stability of the adhesives can only be improved somewhat in the case of 2,5-di-tert.-butyl-hydroquinone, without at the same time having to accept an excessive increase in the finger tight time.

B. The influence of the stabilizer compositions according to the invention consisting of sterically hindered phenol (2,5-di-tert.-butyl hydroquinone) and sulfamide derivatives is investigated in the same way.

For this purpose, in each case 2% by weight of 2,5-di-tert.-butyl hydroquinone and 1% by weight of the particular sulfamide derivative are added to the adhesive formulation described in example 4A and once again the gelation time at 80° C. and the finger tight time on non-degreased steel screws are determined. The measured values are given in table 2.

TABLE 2

| Sulfamide derivative <br> $R^3-\overset{O}{\underset{\|}{C}}-NH-SO_2-NH-\overset{O}{\underset{\|}{C}}-R^3$ | Gelation time (80° C.) (min) | Finger tight time (min) before aging | Finger tight time (min) after aging |
|---|---|---|---|
| $R^3 =$ | | | |
| no sulfamide derivative | 25 | 7 | — |
| benzyloxy | >600 | 4 | 5 |
| diphenylmethoxy | >600 | 4 | 7 |
| phenoxy | >600 | 3 | 6 |
| H | >600 | 3 | 5 |
| methyl | >600 | 2 | 4 |
| benzyl | >600 | 3 | 5 |
| trifluoromethyl | >600 | 2 | 3 |

In summarizing, it can be stated that the stabilizer compositions according to the invention lead to a more than 20-fold increase in the gelation time corresponding to a comparable increase in the stability during storage. However, unlike in the case of the hitherto known stabilizers this does not lead to an increase in the curing rate, expressed by the finger tight time. In fact, there is a relative shortening of the curing process. Even after 24 hours of accelerated ageing at 80° C., the excellent curing properties remain almost unchanged, as is apparent from the measured values of the "finger tight time after ageing."

It is claimed:

1. An anaerobically curable sealant and adhesive composition comprising a polymerizable acrylate ester monomer selected from the group consisting of mono acrylate, diacrylate, triacrylate, monomethacrylate, dimethacrylate and trimethacrylate ester, a redox system as accelerator, and a sulfamide compound of the general formula

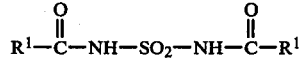

in which the groups $R^1$ which may be identical or different are each a radical selected from the group consisting of linear or branched alkyl with 1 to 18 carbon atoms, cycloalkyl with 3 to 8 carbon atoms, phenylmethyl, trifluoro- or trichloromethyl or hydrocarbyloxy $-OR^2$, $R^2$ being selected from the group consisting of linear or branched alkyl with 1 to 18 carbon atoms, cycloalkyl with 3 to 8 carbon atoms, phenyl, di- or triphenylmethyl, phenylalkyl with 1 to 4 carbon atoms in the alkyl group, or alkylphenyl with 1 to 4 carbon atoms in the alkyl radical or radicals.

2. The composition according to claim 1 comprising as sulfamide derivative the reaction product of sulfuryl diisocyanate with a carboxylic acid $R^1COOH$ in which $R^1$ is defined as above but may not be an alkoxy radical in tetrahydrofuran.

3. The composition according to claim 1 comprising a combination of 1 to 90% by weight of the sulfamide and 99 to 10% by weight of a phenolic anti-oxidant.

4. The composition according to claim 3 which comprises a phenol of the general formula

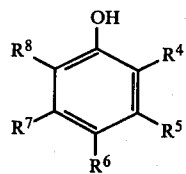

in which $R^4$, $R^5$, $R^7$ and $R^8$ are each a radical selected from hydrogen and lower alkyl with 1 to 4 carbon atoms, and in which the group $R^6$ is a radical selected from the group consisting of hydrogen, lower alkyl with 1 to 4 carbon atoms, hydroxy or methoxy.

5. The composition according to claim 4 comprising 2,5-di-tert.-butylhydroquinone.

6. The composition according to claim 1, 2, 3, 4 or 5 in which the redox system comprises cumene hydroperoxide and an amine selected from the group consisting of a tertiary aromatic amine or a secondary heterocyclic amine with hydrogenated heterocyclic ring.

7. The composition according to claim 6 comprising further a sulfimide as accelerator.

8. The composition according to claim 7 comprising further as the sulfimide, benzoic sulfimide benzosulfimide.

* * * * *